(12) United States Patent
Kageyama

(10) Patent No.: US 10,481,362 B2
(45) Date of Patent: Nov. 19, 2019

(54) CIRCUMFERENTIAL ANGLE ADJUSTMENT DEVICE FOR GENERATRIX OF CYLINDRICAL LENS, AND LENS BARREL EQUIPPED WITH CIRCUMFERENTIAL ANGLE ADJUSTMENT DEVICE FOR GENERATRIX OF CYLINDRICAL LENS

(71) Applicant: NITTOH INC., Suwa-shi, Nagano (JP)

(72) Inventor: Takuya Kageyama, Suwa (JP)

(73) Assignee: Nittoh Inc. (JP)

( * ) Notice: Subject to any disclaimer, the term of this patent is extended or adjusted under 35 U.S.C. 154(b) by 0 days.

(21) Appl. No.: 15/550,650

(22) PCT Filed: Dec. 24, 2015

(86) PCT No.: PCT/JP2015/085977
§ 371 (c)(1),
(2) Date: Aug. 11, 2017

(87) PCT Pub. No.: WO2016/132652
PCT Pub. Date: Aug. 25, 2016

(65) Prior Publication Data
US 2018/0024311 A1    Jan. 25, 2018

(30) Foreign Application Priority Data
Feb. 18, 2015 (JP) .................. 2015-029721

(51) Int. Cl.
*G02B 7/02* (2006.01)
*G02B 7/04* (2006.01)
(Continued)

(52) U.S. Cl.
CPC .............. *G02B 7/023* (2013.01); *G02B 7/04* (2013.01); *G02B 13/08* (2013.01); *G03B 21/142* (2013.01); *G03B 37/06* (2013.01)

(58) Field of Classification Search
CPC .................................. G02B 7/023; G02B 7/04
See application file for complete search history.

(56) References Cited

U.S. PATENT DOCUMENTS

| | | |
|---|---|---|
| 2,740,328 A | 4/1956 | Boughton et al. |
| 6,204,979 B1 | 3/2001 | Matsui |
| (Continued) | | |

FOREIGN PATENT DOCUMENTS

| | | |
|---|---|---|
| JP | S55-009532 A | 1/1980 |
| JP | S55-40409 A | 3/1980 |
| (Continued) | | |

OTHER PUBLICATIONS

Extended European Search Report for EP Application No. 15882753.5, dated Oct. 9, 2018 (7 pages).
(Continued)

*Primary Examiner* — Jack Dinh
(74) *Attorney, Agent, or Firm* — Harness, Dickey & Pierce, P.L.C.

(57) ABSTRACT

A circumferential angle adjustment device for a generatrix of a cylindrical lens, comprising: a lens holding tube which holds the cylindrical lens; an outer peripheral tube in which the lens holding tube is arranged on an inner peripheral side thereof; a cam member which is provided on an outer peripheral side of the lens holding tube and has a cam surface eccentric with respect to an axis intersecting with an optical axis of the lens holding tube, and a cam member engaging portion which is formed in the outer peripheral tube and engages with the cam member in the circumferential direction of the optical axis, wherein the lens holding tube is supported with respect to the outer peripheral tube in at least three directions at regular intervals in the circumferential direction of the optical axis.

15 Claims, 4 Drawing Sheets

(51) Int. Cl.
  *G02B 13/08* (2006.01)
  *G03B 21/14* (2006.01)
  *G03B 37/06* (2006.01)

(56) References Cited

U.S. PATENT DOCUMENTS

2003/0214731 A1  11/2003  Hayashide
2012/0257294 A1  10/2012  Kashiwaba

FOREIGN PATENT DOCUMENTS

| | | |
|---|---|---|
| JP | S60-28716 U | 2/1985 |
| JP | S62-134613 A | 6/1987 |
| JP | S62-279529 A | 12/1987 |
| JP | H01-096612 A | 4/1989 |
| JP | H03-025407 A | 2/1991 |
| JP | H03-274514 A | 12/1991 |
| JP | H04-028610 U | 3/1992 |
| JP | H04-307511 A | 10/1992 |
| JP | H06-018756 A | 1/1994 |
| JP | 2001-281514 A | 10/2001 |
| JP | 2012-220713 A | 11/2012 |
| JP | 2013-238792 A | 11/2013 |
| JP | 2014-010379 A | 1/2014 |

OTHER PUBLICATIONS

Decision to Grant a Patent for JP Application No. 2015-029721, dated May 30, 2019 (5 pages).

CIRCUMFERENTIAL ANGLE ADJUSTMENT DEVICE FOR GENERATRIX OF CYLINDRICAL LENS, AND LENS BARREL EQUIPPED WITH CIRCUMFERENTIAL ANGLE ADJUSTMENT DEVICE FOR GENERATRIX OF CYLINDRICAL LENS

CROSS REFERENCE TO RELATED APPLICATIONS

This is a U.S. National Stage Application of PCT/JP2015/085977, filed on Dec. 24, 2015, which claims priority to Japanese Patent Application No. 2015-029721, filed on Feb. 18, 2015. The entire disclosures of the above applications are incorporated herein by reference.

TECHNICAL FIELD

The present invention relates to a circumferential angle adjustment device for a generatrix of a cylindrical lens and a lens barrel equipped with the circumferential angle adjustment device for a generatrix of a cylindrical lens.

BACKGROUND ART

For example, in filming and replay (video projection) in the Cinema Scope system using a movie film, the filming is performed with the size in the right-left direction compressed or scaled down into about half of the screen for movie (wide screen) at the time of filming, and the image filmed under compression is enlarged and returned into the original size to be projected as a wide screen movie at the time of replay. The compression of the image at the time of filming and the restoration of the image at the time of replay are performed using a photographing lens and a projection lens for which cylindrical lenses are provided as disclosed in JP H3-25407A.

However, when a plurality of cylindrical lenses are provided, it is necessary to make generatrices of the cylindrical lenses coincide with each other. Hence, an object of the present invention is to provide a circumferential angle adjustment device for a generatrix of a cylindrical lens, which enables generatrices of a plurality of cylindrical lenses coincide with each other.

SUMMARY

To solve the above problems, a circumferential angle adjustment device for a generatrix of a cylindrical lens, includes: a lens holding tube which holds the cylindrical lens; an outer peripheral tube in which the lens holding tube is arranged on an inner peripheral side thereof; a cam member which is provided on an outer peripheral side of the lens holding tube and has a cam surface eccentric with respect to an axis intersecting with an optical axis of the lens holding tube, and a cam member engaging portion which is formed in the outer peripheral tube and engages with the cam member in the circumferential direction of the optical axis, wherein the lens holding tube is supported with respect to the outer peripheral tube in at least three directions at regular intervals in the circumferential direction of the optical axis.

In addition to the above invention, the above-described circumferential angle adjustment device for a generatrix of a cylindrical lens further includes: an adjustment ring in which the outer peripheral tube is arranged on an inner peripheral side thereof; and a lens holding tube moving mechanism which moves the lens holding tube along the optical axis by rotation of the adjustment ring in the circumferential direction of the optical axis.

In addition to the above invention, the lens holding tube moving mechanism of the above-described circumferential angle adjustment device for a generatrix of a cylindrical lens includes: an engaging means which engages the lens holding tube and the adjustment ring with each other in a direction along the optical axis and allows rotation of the adjustment ring in the circumferential direction of the optical axis; and screw parts at an outer peripheral surface of the outer peripheral tube and at an inner peripheral surface of the adjustment ring, which move the adjustment ring along the optical axis by rotation of the adjustment ring in the circumferential direction of the optical axis, the engaging means includes: a projecting portion at an outer periphery of the lens holding tube, which projects toward the adjustment ring; and a projecting portion engaging recessed portion which is formed in the inner peripheral surface of the adjustment ring along the circumferential direction of the optical axis, and engages with the projecting portion, the outer peripheral tube is formed with a projecting portion insertion hole through which the projecting portion is inserted, and gaps are provided in the circumferential direction of the optical axis and in a direction parallel to the optical axis between the projecting portion inserted through the projecting portion insertion hole and the projecting portion insertion hole.

Further, in addition to the above invention, in the above-described circumferential angle adjustment device for a generatrix of a cylindrical lens, the cam member engaging portion is formed in the projecting portion insertion hole.

To solve the above problems, a lens barrel includes the above-described circumferential angle adjustment device for a generatrix of a cylindrical lens.

Further, in addition to the above invention, in the above-described lens barrel, the circumferential angle adjustment device for a generatrix of a cylindrical lens is provided for a cylindrical lens which is arranged on a rear side of a front group of a plurality of lenses provided in the lens barrel.

DETAILED DESCRIPTION

Figure 1:
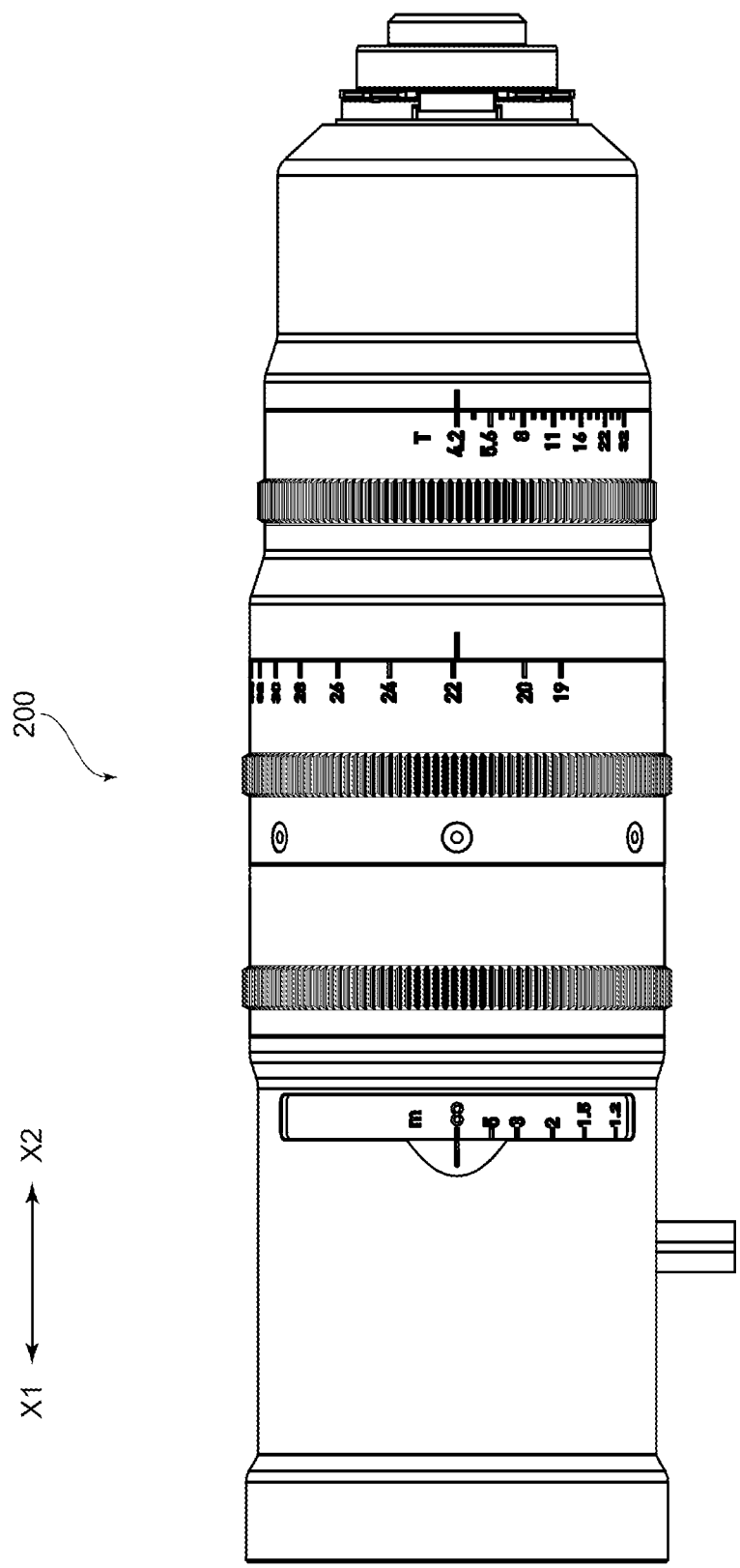
FIG. 1 is a perspective view of an external appearance of a photographing lens barrel to which a circumferential angle adjustment device for a generatrix of a cylindrical lens according to an embodiment of the present invention is attached.
Figure 2:
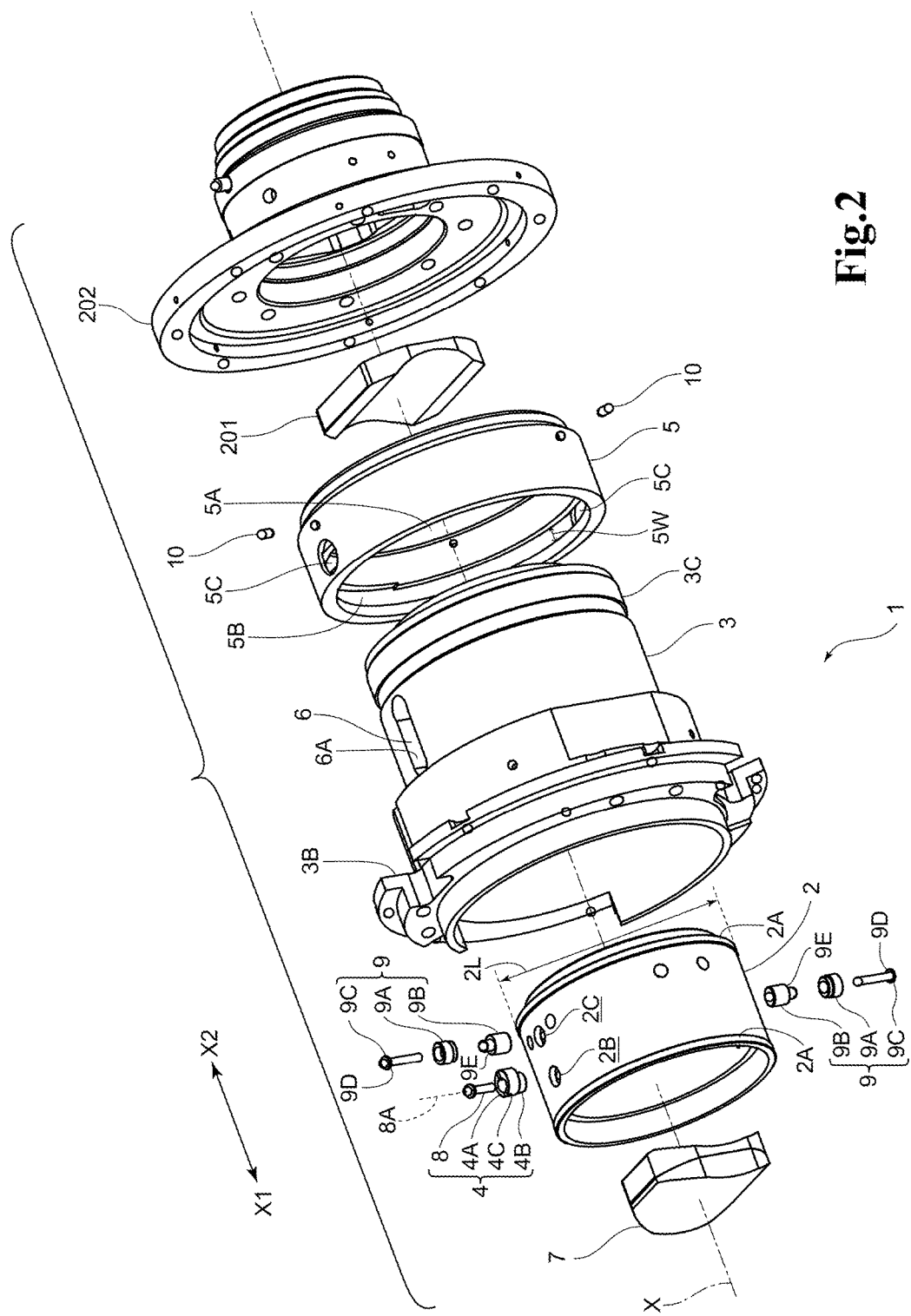
FIG. 2 is an exploded perspective view of the adjustment device.
Figure 3:
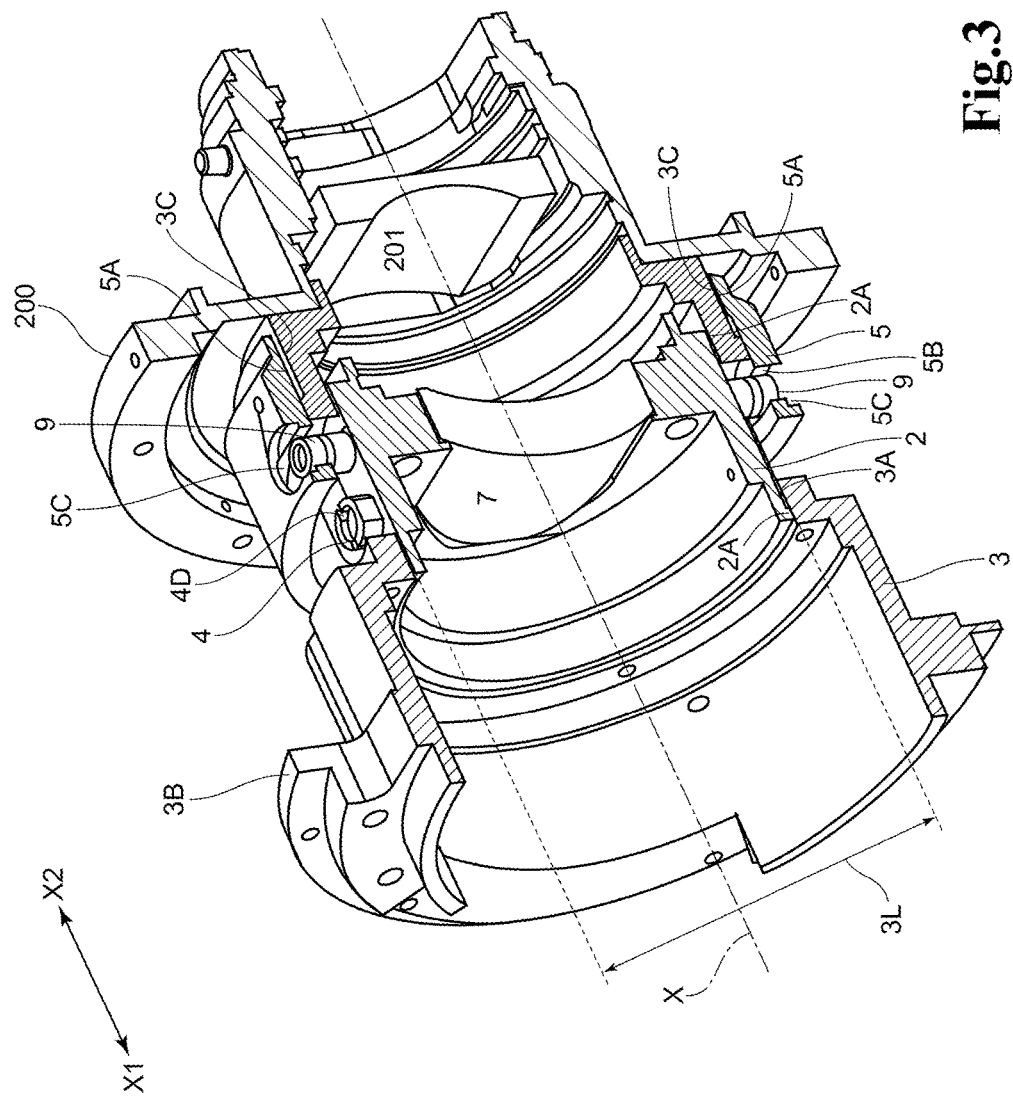
FIG. 3 is a view illustrating the configuration of a cross section in a plane including an optical axis of the adjustment device.

FIG. 1 is a front view of an external appearance of a photographing lens barrel 200, as an example of a lens barrel, to which a circumferential angle adjustment device for a generatrix of a cylindrical lens (hereinafter, described simply as an "adjustment device") 1 according to an embodiment of the present invention (see FIG. 2) is attached. The photographing lens barrel 200 is equipped with two or more cylindrical lenses. FIGS. 2 and 3 are views illustrating the configuration of the adjustment device 1. FIG. 2 is an exploded perspective view of the adjustment device 1. FIG. 3 is a view illustrating the configuration of a cross section in a plane including an optical axis X of the adjustment device 1. In the following description, the description will be made with an arrow X1 direction illustrated in the drawings regarded as the front and an arrow X2 direction illustrated in the drawings regarded as the rear. In the photographing lens barrel 200 and the adjustment device 1, photographing light proceeds from the arrow X1 direction toward the arrow X2 direction.

Adjustment Device 1

The adjustment device 1 has a lens holding tube 2, an outer peripheral tube 3, a cam member 4, an adjustment ring 5, and a long hole 6. In the lens holding tube 2, a cylindrical lens 7 is held. The cylindrical lens 7 is a lens which is a target to be adjusted by the adjustment device 1. In other words, the adjustment device 1 enables adjustment of the angle of the generatrix of the cylindrical lens 7 in the circumferential direction (hereinafter, described simply as a "circumferential angle") with respect to the optical axis X (hereinafter, this adjustment is described as "circumferential angle adjustment"). Further, the adjustment device 1 enables position adjustment in a thrust direction (a direction parallel to the optical axis X, namely, a front-rear direction) of the cylindrical lens 7 (hereinafter, this adjustment is described as "thrust position adjustment").

In FIGS. 2, and 3, a cylindrical lens 201 which is arranged at the rear of the adjustment device 1 is held in a lens holding tube 202. The photographing lens barrel 200 includes the adjustment device 1 so as to achieve the circumferential angle adjustment and thrust position adjustment of the cylindrical lens 7 with respect to the cylindrical lens 201. Accordingly, the generatrix of the cylindrical lens 7 can be made to coincide with the generatrix of the cylindrical lens 201 by the circumferential angle adjustment. Further, the lens interval between the cylindrical lens 7 and the cylindrical lens 201 can be adjusted by the thrust position adjustment.

Lens Holding Tube 2, Outer Peripheral Tube 3

The lens holding tube 2 is inserted into the inner periphery of the outer peripheral tube 3. In other words, the lens holding tube 2 is arranged on the inner peripheral side of the outer peripheral tube 3. At the front and rear of an outer peripheral surface of the lens holding tube 2, rim parts 2A, 2A, which project to the outside over the entire circumference and are in contact with an inner peripheral surface 3A (see FIG. 3) of the outer peripheral tube 3, are formed at the front and rear. In other words, the lens holding tube 2 is supported with respect to the outer peripheral tube 3 at the rim parts 2A, 2A over the entire circumference in the circumferential direction of the optical axis X. Further, a diameter 2L at the rim parts 2A, 2A of the lens holding tube 2 and a diameter 3L at the inner periphery of the outer peripheral tube 3 (see FIG. 3) are set so that the lens holding tube 2 can smoothly move in the thrust direction without backlash in a radial direction (a direction perpendicular to the optical axis X) with respect to the outer peripheral tube 3 and can also smoothly rotate in the circumferential direction of the optical axis X in a state where the lens holding tube 2 is inserted in the inner periphery of the outer peripheral tube 3.

On the outer periphery on the front side of the outer peripheral tube 3, a flange part 3B protruding to the outside in the diameter direction is provided. The flange part 3B is an attachment portion of the adjustment device 1 to the photographing lens barrel 200. More specifically, the adjustment device 1 is attached to a not-illustrated attachment portion on the photographing lens barrel 200 side via the flange part 3B with a screw or the like, and thereby fixed to the photographing lens barrel 200.

Cam Member 4

Figure 4:
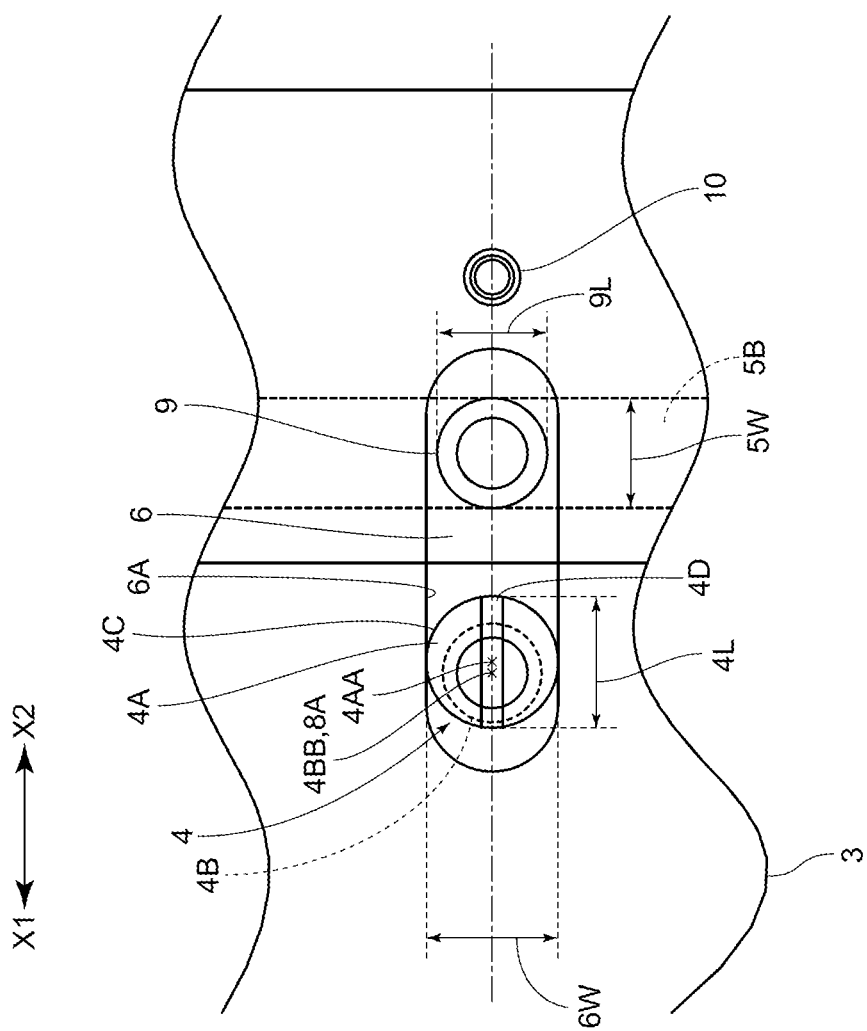
FIG. 4 is a view illustrating an enlarged portion where a cam member and a cam follower of the adjustment device are attached.

The cam member 4 has a large diameter part 4A and a small diameter part 4B. Both of the large diameter part 4A and the small diameter part 4B have cylindrical shapes, and the outer peripheral surface of the large diameter part 4A is configured as a cam surface 4C. As illustrated in FIG. 4, a center axis 4AA of the large diameter part 4A is eccentric with respect to a center axis 4BB of the small diameter part 4B. FIG. 4 is a view illustrating an enlarged portion where the cam member 4 and a later-described cam followers 9 of the adjustment device 1 are attached.

The lens holding tube 2 is formed with a hollow part 2B into which the small diameter part 4B can be fitted. The cam member 4 is attached to the lens holding tube 2 with an attachment pin 8 with the small diameter part 4B fitted into the hollow part 2B. The attachment pin 8 penetrates the cam member 4 and is press-fitted or screwed to the lens holding tube 2. A center axis 8A of the attachment pin 8 and the center axis 4BB (see FIG. 4) of the small diameter part 4B coincide with each other, and each of the axes is arranged to be perpendicular to the optical axis X. The large diameter part 4A can eccentrically rotate using the center axis 4BB and center axis 8A as a rotation axis. In other words, the cam surface 4C is a cam surface eccentric with respect to the axis perpendicular to the optical axis X.

Cam Follower 9

To the lens holding tube 2, the cam followers 9 as a projecting portion which projects to the outer periphery of the lens holding tube 2 are attached. The cam followers 9 are provided at two places across the optical axis X.

The cam follower 9 has a collar part 9A, a support part 9B which rotatably supports the collar part 9A, and an attachment pin 9C. The lens holding tube 2 is formed with a hollow part 2C into which the support part 9B can be fitted. The cam follower 9 is attached to the lens holding tube 2 with the attachment pin 9C with the support part 9B fitted into the hollow part 2C. The attachment pin 9C penetrates the collar part 9A and the support part 9B and is press-fitted or screwed to the lens holding tube 2. The collar part 9A, in a state of being sandwiched between a circular flange part 9D projecting to outer periphery at a rear end of the attachment pin 9C and a stepped part 9E of the support part 9B, is rotatable around the support part 9B.

Adjustment Ring 5

The rear end of the outer peripheral tube 3 is inserted into the inner periphery of the adjustment ring 5. A male screw part 3C is formed at the outer peripheral surface of the outer peripheral tube 3, and a female screw part 5A is formed at the inner peripheral surface of the adjustment ring 5. The male screw part 3C and the female screw part 5A are screwed together with each other when the outer peripheral tube 3 is inserted into the inner periphery of the adjustment ring 5. Accordingly, when the adjustment ring 5 is rotated in the circumferential direction of the optical axis X in a state where the male screw part 3C and the female screw part 5A are screwed together, the adjustment ring 5 moves forward and rearward in the thrust direction with respect to the outer peripheral tube 3 following lead of the male screw part 3C and the female screw part 5A.

In the inner peripheral surface of the adjustment ring 5, a groove part 5B is formed as a projecting portion engaging recessed portion. The groove part 5B is formed along a plane perpendicular to the optical axis X over the entire circumference of the inner peripheral surface of the adjustment ring 5. A width 5W in the front-rear direction of the groove part 5B is set so that the collar part 9A of the cam follower 9 is fitted therein without backlash in the front-rear direction and the groove part 5B can be smoothly moved in the circumferential direction of the optical axis X with respect to the collar part 9A. In other words, the cam follower 9 engages with the groove part 5B so as not to move to the front side or the rear side, and the groove part 5B can move in the circumferential direction of the optical axis X with respect to the cam follower 9. The adjustment ring 5 is formed with hole parts 5C. The hole parts 5C are hole parts which penetrate the adjustment ring 5 to the inner peripheral side and outer peripheral side at a portion of the groove part 5B. The hole parts 5C are provided at two places across the optical axis X.

Long Hole 6

The outer peripheral tube 3 is formed with the long holes 6 as projecting portion insertion holes long in the front-rear direction parallel to the optical axis X. The long holes 6 are provided at two places across the optical axis X. In a state where the lens holding tube 2 is inserted into the inner peripheral side of the outer peripheral tube 3, the cam member 4 is attached to the lens holding tube 2 through the long hole 6 that is one of the long holes 6 provided at the two places across the optical axis X. Further, the outer peripheral tube 3, into which the lens holding tube 2 is inserted, is inserted into the inner peripheral side of the adjustment ring 5, and the male screw part 3C and the female screw part 5A are subjected to screw coupling. Then, the rotation position of the adjustment ring 5 in the circumferential direction of the optical axis X is adjusted so that the hole parts 5C are superposed on the long holes 6, and the cam followers 9 are attached to the lens holding tube 2 through the hole parts 5C and the long holes 6 in a state where the hole parts 5C are superposed on the long holes 6.

As illustrated in FIG. 4, a diameter 4L of the large diameter part 4A of the cam member 4 and a width 6W of the long hole 6 in the circumferential direction of the optical axis X are set so that there is no backlash in the circumferential direction of the optical axis X between the cam surface 4C and an inner peripheral surface 6A of the long hole 6 and the cam member 4 can move in the thrust direction with respect to the outer peripheral tube 3. The inner peripheral surface 6A of the long hole 6 engages with the cam surface 4C of the large diameter part 4A in the circumferential direction of the optical axis X. In other words, the long hole 6, on the side where the cam member 4 is made to pass therethrough, of the two long holes 6 functions as a cam member engaging portion.

A diameter 9L of the collar part 9A of the cam follower 9 is set to be smaller than the width 6W of the long hole 6. Accordingly, a gap is formed between the collar part 9A and the inner peripheral surface 6A of the long hole 6. Concretely, the difference between the diameter 9L and the width 6W is set to be twice or more the eccentricity amount of the cam member 4.

Adjustment Operation of the Adjustment Device 1

The operations of the circumferential angle adjustment and thrust position adjustment of the cylindrical lens 7 by the adjustment device 1 configured as described above will be described. The circumferential angle adjustment is performed utilizing the cam member 4. The cam surface 4C of the large diameter part 4A is eccentric with respect to the center axis 8A. Besides, the long hole 6 and the large diameter part 4A are in contact with each other in the circumferential direction of the optical axis X. Accordingly, when the large diameter part 4A of the cam member 4 is rotated around the center axis 8A, the lens holding tube 2 turns according to the rotation amount in the circumferential direction of the optical axis X. When the lens holding tube 2 turns in the circumferential direction of the optical axis X, the cylindrical lens 7 held in the lens holding tube 2 also turns. In other words, rotating the large diameter part 4A of the cam member 4 around the center axis 8A makes it possible to adjust the circumferential angle of the generatrix of the cylindrical lens 7.

When the lens holding tube 2 turns in the circumferential direction of the optical axis X, the cam followers 9 attached to the lens holding tube 2 turn together therewith. The diameter 9L of the collar part 9A of the cam follower 9 is set to be smaller than the width 6W of the long hole 6, so that a gap is made in the circumferential direction of the optical axis X between the collar part 9A and the long hole 6. Accordingly, the movement of the cam follower 9 in the circumferential direction of the optical axis X when the lens holding tube 2 turns in the circumferential direction of the optical axis X is allowed.

On the end surface of the large diameter part 4A, a groove 4D is formed into which a flathead screwdriver can be fitted. By fitting the flathead screwdriver into the groove 4D from the outside of the long hole 6, the large diameter part 4A can be easily rotated.

When the adjustment ring 5 is rotated in the circumferential direction of the outer peripheral tube 3, the adjustment ring 5 moves forward and rearward with respect to the outer peripheral tube 3 due to the operations of the female screw part 5A and the male screw part 3C. The groove part 5B and the cam follower 9 are engaged with each other so as not to move in the front-rear direction. Accordingly, forward and rearward movement of the adjustment ring 5 makes the cam follower 9 move forward and rearward to thereby move the lens holding tube 2 forward and rearward. In other words, rotating the adjustment ring 5 and thereby moving the adjustment ring 5 forward and rearward with respect to the outer peripheral tube 3 moves the cylindrical lens 7 held in the lens holding tube 2 forward and rearward, thereby enabling adjustment of an inter-lens distance with respect to the cylindrical lens 201.

When the lens holding tube 2 moves in the thrust direction, the cam member 4 and cam follower 9 which are attached to the lens holding tube 2 also move together therewith. The length of the long hole 6 in the front-rear direction is set to be longer than the length in the front-rear direction where the cam member 4 and the cam follower 9 are arranged. Accordingly, at the time when the lens holding tube 2 moves in the front-rear direction, movement in the front-rear direction of the cam member 4 and the cam follower 9 is allowed.

Note that by filling a space between the cam member 4 and the long hole 6 with an adhesive after completion of the circumferential angle adjustment and thrust position adjustment of the cylindrical lens 7, the rotation of the cam member 4 can be stopped. Besides, by screwing a fixing screw 10 from the adjustment ring 5 to the outer peripheral tube 3 side, the rotation of the adjustment ring 5 with respect to the outer peripheral tube 3 can be stopped.

Main Effect of the Embodiment of the Present Invention

The adjustment device 1 has the lens holding tube 2 which holds the cylindrical lens 7, the outer peripheral tube 3 in which the lens holding tube 2 is arranged on the inner peripheral side thereof, the cam member 4 which is provided on the outer peripheral side of the lens holding tube 2 and has the cam surface 4C eccentric with respect to the center axis 8A (center axis 4BB) being the axis intersecting with the optical axis X of the lens holding tube 2, and the long hole 6 as the cam member engaging portion which is formed in the outer peripheral tube 3 and engages with the cam member 4 in the circumferential direction of the optical axis X. Further, at the front and rear of the outer peripheral surface of the lens holding tube 2, the rim parts 2A, 2A, which project to the outside over the entire circumference and are in contact with the inner peripheral surface 3A of the outer peripheral tube 3, are formed, and the lens holding tube 2 is supported with respect to the outer peripheral tube 3 via the rim parts 2A, 2A over the entire circumference in the circumferential direction of the optical axis X.

The adjustment device 1 having the above-described configuration has the lens holding tube 2 supported in the outer peripheral tube 3 over the entire circumference. Therefore, the lens holding tube 2 can rotate around the optical axis X in the outer peripheral tube 3. Further, the adjustment device 1 has the cam member 4 provided at the lens holding tube 2, and the long holes 6 which are formed in the outer peripheral tube 3 and can engage with the cam member 4. The cam member 4 is rotatable around the center axis 8A (center axis 4BB) being the axis intersecting with the optical axis X, and the lens holding tube 2 is rotatable around the optical axis X. Therefore, rotating the cam member 4 enables the lens holding tube 2 to turn in the circumferential direction of the optical axis X, thereby enabling adjustment of the circumferential angle of the generatrix of the cylindrical lens 7 held in the lens holding tube 2.

The above-described adjustment device 1 has the lens holding tube 2 supported by the outer peripheral tube 3 over the entire circumference in the circumferential direction of the optical axis X. The lens holding tube 2, however, only needs to be supported in at least three directions at regular intervals in the circumferential direction of the optical axis X. The lens holding tube 2 is supported in the three directions at regular intervals in the circumferential direction of the optical axis X and can thereby be rotated around the optical axis X. For example, the rim parts 2A, 2A are not provided on the entire circumference of lens holding tube 2 but may be configured to be divided into three parts at regular intervals in the circumferential direction of the optical axis X.

The above-described adjustment device 1 has the adjustment ring 5 in which the outer peripheral tube 3 is arranged on the inner peripheral side thereof, and the outer peripheral tube 3 and the adjustment ring 5 have the male screw part 3C and the female screw part 5A which screw-couple with each other as screw parts. The lens holding tube 2 has the cam followers 9 as the projecting portion, the adjustment ring 5 has the groove part 5B as the projecting portion engaging recessed portion, and the outer peripheral tube 3 is formed with the long holes 6 as the projecting portion insertion holes through which the cam followers 9 are inserted. Between the cam follower 9 and the long hole 6, gaps are formed in the circumferential direction of the optical axis X and in the thrust direction.

The adjustment device 1 has the above-described configuration and thereby rotates the adjustment ring 5 in the circumferential direction of the optical axis X, thus enabling the adjustment ring 5 to move forward and rearward in the thrust direction. The movement of the adjustment ring 5 in the thrust direction makes it possible to move the lens holding tube 2 in the thrust direction via the groove part 5B and the cam follower 9, thereby enabling the thrust position adjustment of the cylindrical lens 7.

In the adjustment device 1, the cam followers 9 and the groove part 5B are provided as an engaging means which engages the lens holding tube 2 and the adjustment ring 5 with each other in the direction along the optical axis X and allows the rotation of the adjustment ring 5 in the circumferential direction of the optical axis X. Further, an engaging means which includes the cam followers 9, the groove part 5B, the male screw part 3C and the female screw part 5A is provided as a lens holding tube moving mechanism which moves the lens holding tube 2 in the thrust direction by rotation of the adjustment ring 5 in the circumferential direction of the optical axis X. However, the lens holding tube moving mechanism is not limited to the above configuration but may be configured such that, for example, the groove part 5B is a cam groove having a cam angle inclined in the front-rear direction. When this configuration is employed, the lens holding tube 2 can be moved in the front-rear direction only by rotating the adjustment ring 5 in the circumferential direction of the optical axis X even without moving the adjustment ring 5 forward and rearward by the operations of the male screw part 3C and the female screw part 5A. Besides, the projecting portions engaged with the groove part 5B are not limited to the cam followers 9, but only need to be engaged with the groove part 5B so as to allow rotation of the adjustment ring 5 in the circumferential direction of the optical axis X. Accordingly, the projecting portion engaged with the groove part 5B may be, for example, cylindrical projections in place of the cam followers 9. However, employment of the cam followers 9 enables smooth rotation of the adjustment ring 5 because the collar part 9A rotates.

In the adjustment device 1, the long holes 6 as the projecting portion insertion holes are configured to serve also as the cam member engaging portion, but may be configured such that a hole portion for engaging the cam member through which the cam member 4 is inserted and a hole portion for inserting the projecting portion through which the cam follower 9 is inserted are individually provided. However, the hole portion for inserting the projecting portion serves also as the hole portion for engaging the cam member, thereby enabling simplification of the configuration of the outer peripheral tube 3.

The photographing lens barrel 200 is provided with a plurality of cylindrical lenses, and the adjustment device 1 is provided for at least one of the cylindrical lenses. Using the adjustment device 1 makes it possible to perform the circumferential angle adjustment and thrust position adjustment of the generatrix of the cylindrical lens for which the adjustment device 1 is provided, and to perform the circumferential angle adjustment of generatrices between the cylindrical lenses and adjustment of the inter-lens distance.

The cylindrical lens which is the target to be adjusted by the adjustment device 1 may be used as a front lens of the photographing lens barrel 200, namely, a lens at the forefront surface with respect to a subject, and is preferably arranged behind the front lens. Arranging the cylindrical lens behind the front lens enables reduction in size of the cylindrical lens. Also in the case where the adjustment device 1 is used in a projection (video projection) lens barrel for image projection or for video projection, it is similarly preferable to arrange the cylindrical lens which is the adjustment target behind the forefront position with respect to a projection (video projection) plane rather than to provide the cylindrical lens at the forefront position, from the viewpoint of reduction in size of the cylindrical lens and from the viewpoint of enabling the cylindrical lens to take charge of aberration correction.

An example in which the above-described adjustment device 1 performs the circumferential angle adjustment and thrust position adjustment of the cylindrical lens 7 with respect to the cylindrical lens 201 is illustrated, but may have one of the adjustments. Besides, when a plurality of cylindrical lenses which are the adjustment targets are provided, the adjustment device 1 is preferably provided for each of the lenses which are the adjustment targets, but the adjustment device 1 may be provided only for a cylindrical lens exerting larger effect on an image forming state.

The invention claimed is:

1. A circumferential angle adjustment device for a generatrix of a cylindrical lens, comprising:
   a lens holding tube which holds the cylindrical lens, the lens holding tube having an optical axis;
   an outer tube in which the lens holding tube is arranged at an inner periphery of the outer tube, the outer tube having a longitudinal through-hole, the longitudinal through-hole extending parallel to the optical axis; and
   a cam member which is provided at an outer periphery of the lens holding tube and has a cam surface eccentric with respect to a cam axis intersecting with the optical axis, the cam surface slidably engaging with an inner surface of the longitudinal through-hole so that the cam member moves in a direction parallel to the optical axis,
   wherein the lens holding tube is rotatably supported with respect to the outer tube in a circumferential direction of the optical axis.

2. The circumferential angle adjustment device for a generatrix of a cylindrical lens according to claim 1, further comprising:
   an adjustment ring in which the outer tube is arranged at an inner peripheral of the adjusting ring; and
   a lens holding tube moving mechanism which moves the lens holding tube along the optical axis by rotation of the adjustment ring in the circumferential direction of the optical axis.

3. The circumferential angle adjustment device for a generatrix of a cylindrical lens according to claim 2,
   wherein the lens holding tube moving mechanism includes:
      an engaging member which engages the lens holding tube with the adjustment ring in a direction along the optical axis and allows rotation of the adjustment ring in the circumferential direction of the optical axis; and
      a guide member disposed at an outer peripheral surface of the outer tube and at an inner peripheral surface of the adjustment ring, the guide member being configured to move the adjustment ring along the optical axis by rotation of the adjustment ring in the circumferential direction of the optical axis,
   wherein the engaging member includes:
      a projection disposed at the outer periphery of the lens holding tube, the projection projecting toward the adjustment ring; and
      an engaging recess which is formed in the inner peripheral surface of the adjustment ring along the circumferential direction of the optical axis, the engaging recess engaging with the projection,
   wherein the outer tube is formed with a hole through which the projection is inserted, and
   wherein a gap is provided in the circumferential direction of the optical axis and in a direction parallel to the optical axis between the projection and the hole when the projection is inserted into the hole.

4. The circumferential angle adjustment device for a generatrix of a cylindrical lens according to claim 3,
   wherein the hole of the outer tube corresponds to the longitudinal through-hole.

5. A lens barrel comprising the circumferential angle adjustment device for a generatrix of a cylindrical lens according to claim 4.

6. The lens barrel according to claim 5,
   wherein the circumferential angle adjustment device for a generatrix of a cylindrical lens is provided for a cylindrical lens which is arranged on a rear side of a front group of a plurality of lenses provided in the lens barrel.

7. A lens barrel comprising the circumferential angle adjustment device for a generatrix of a cylindrical lens according to claim 1.

8. The lens barrel according to claim 7,
   wherein the circumferential angle adjustment device for a generatrix of a cylindrical lens is provided for a cylindrical lens which is arranged on a rear side of a front group of a plurality of lenses provided in the lens barrel.

9. The circumferential angle adjustment device for a generatrix of a cylindrical lens according to claim 1,
   wherein the lens holding tube is rotatably supported with respect to the outer tube in at least three directions at regular intervals in the circumferential direction of the optical axis.

10. A lens barrel comprising the circumferential angle adjustment device for a generatrix of a cylindrical lens according to claim 2.

11. The lens barrel according to claim 10,
    wherein the circumferential angle adjustment device for a generatrix of a cylindrical lens is provided for a cylindrical lens which is arranged on a rear side of a front group of a plurality of lenses provided in the lens barrel.

12. The circumferential angle adjustment device for a generatrix of a cylindrical lens according to claim 2,
    wherein the cam member is rotatable around the cam axis without moving in the direction parallel to the optical axis,
    wherein the lens holding tube moving mechanism includes:
       an engaging member which engages the lens holding tube with the adjustment ring in a direction along the optical axis and allows rotation of the adjustment ring in the circumferential direction of the optical axis; and
       a guide member disposed at an outer peripheral surface of the outer tube and at an inner peripheral surface of the adjustment ring, the guide member being configured to move the adjustment ring along the optical axis by rotation of the adjustment ring in the circumferential direction of the optical axis,
    wherein the engaging member includes:
       a projection disposed at the outer periphery of the lens holding tube, the projection projecting toward the adjustment ring, and the projection being rotatable without moving in the direction parallel to the optical axis; and
       an engaging recess which is annularly formed in the inner peripheral surface of the adjustment ring along the circumferential direction of the optical axis, the engaging recess engaging with the projection without backlash in the direction parallel to the optical axis, wherein the outer tube is formed with a hole through which the projection is inserted, and wherein a gap is provided in the circumferential direction of the optical axis and in a direction parallel to the optical axis between the projection and the hole when the projection is inserted into the hole.

13. The circumferential angle adjustment device for a generatrix of a cylindrical lens according to claim 12,
wherein the hole of the outer tube corresponds to the longitudinal through-hole.

14. A lens barrel comprising the circumferential angle adjustment device for a generatrix of a cylindrical lens according to claim 3.

15. The lens barrel according to claim 14,
wherein the circumferential angle adjustment device for a generatrix of a cylindrical lens is provided for a cylindrical lens which is arranged on a rear side of a front group of a plurality of lenses provided in the lens barrel.

* * * * *